United States Patent [19]

Watanabe et al.

[11] Patent Number: 5,153,071
[45] Date of Patent: Oct. 6, 1992

[54] MAGNETIC RECORDING MEDIUM WHEREIN THE MAGNETIC LAYER HAS AS THE BINDER SYSTEM A VINYL CHLORIDE COPOLYMER AND A POLYETHER POLYURETHANE RESIN WHICH CONTAINS A RING STRUCTURE

[75] Inventors: Hideomi Watanabe; Tsutomu Okita; Hiroshi Hashimoto, all of Kanagawa, Japan

[73] Assignee: Fuji Photo Film Co., Ltd., Kanagawa, Japan

[21] Appl. No.: 707,971

[22] Filed: May 23, 1991

Related U.S. Application Data

[63] Continuation of Ser. No. 340,208, Apr. 19, 1989, abandoned.

[30] Foreign Application Priority Data

Apr. 19, 1988 [JP] Japan .................................. 63-97382

[51] Int. Cl.$^5$ ................................................ G11B 5/00
[52] U.S. Cl. ................................ 428/425.9; 428/424.6; 428/694; 428/900; 252/62.54
[58] Field of Search ............... 428/900, 694, 425.9, 428/424.6; 252/62.54

[56] References Cited

U.S. PATENT DOCUMENTS

| | | | |
|---|---|---|---|
| 4,333,988 | 6/1982 | Yamada et al. | 428/425.9 |
| 4,431,712 | 2/1984 | Matsufuji et al. | 428/692 |
| 4,560,616 | 12/1985 | Okita et al. | 428/423.1 |
| 4,677,030 | 6/1987 | Gerum et al. | 428/425.9 |

*Primary Examiner*—Paul J. Thibodeau
*Assistant Examiner*—Stevan A. Resan
*Attorney, Agent, or Firm*—Sughrue, Mion, Zinn Macpeak & Seas

[57] ABSTRACT

A magnetic recording medium comprising a non-magnetic support having thereon a magnetic layer comprising ferromagnetic particles disposed in a binder, the binder comprising a vinyl chloride copolymer and a polyurethane resin, wherein the polyurethane resin is a polyether polyurethane resin containing a polyether polyol having a ring structure.

3 Claims, No Drawings

MAGNETIC RECORDING MEDIUM WHEREIN THE MAGNETIC LAYER HAS AS THE BINDER SYSTEM A VINYL CHLORIDE COPOLYMER AND A POLYETHER POLYURETHANE RESIN WHICH CONTAINS A RING STRUCTURE

This is a continuation of application Ser. No. 07/340,208, filed Apr. 19, 1989, now abandoned.

FIELD OF THE INVENTION

This invention relates to a magnetic recording medium comprised of a non-magnetic support and a magnetic layer.

BACKGROUND OF THE INVENTION

Generally a magnetic recording medium (hereinafter sometimes called "a magnetic tape") comprising a non-magnetic support having provided thereon a magnetic layer containing ferromagnetic metal oxide particles comprised of acicular crystals such as $\gamma\text{-}Fe_2O_3$, Co-containing magnetic iron oxide or $CrO_2$ disspersed in a binder is used as a magnetic recording medium such as an audio tape, a video tape or a computer tape. Particularly with the recent demand for higher density recording, a magnetic tape using ferromagnetic metal fine particles instead of ferromagnetic metal oxide particles has been used.

Recording of information and reproducing information are accomplished by running moving the magnetic recording medium in a manner so that a surface of the magnetic layer contacts a magnetic head. Improvement of running durability of a magnetic layer is strongly desired, because recording and reproducing are done at an extremely high speed and quite often.

Polyurethane resins of the polyester type which are excellent in wear resistance are generally used as binder resins for forming a magnetic layer to obtain running durability. However, polyurethane resins of this type are easily hydrolyzed, and are easily deteriorated by corrosive gas, moisture, light and heat. When this kind of resin is stored and used for a long period of term, for example, when this resin is allowed to stand under hard conditions, such as in a car in summer, the magnetic layer tends to deteriorate, and not only running durability but also storage stability are insufficient. Particularly, there is a problem of durability such as running durability after a long storage.

Recently, polycarbonate polyurethane resins have been used as polyurethane resins instead of the polyester type polyurethane resins because they are improved regarding hydrolysis resistance. A magnetic recording medium using a polycarbonate polyurethane resin is disclosed in JP-A-58-60430, JP-A-59-198530 and U.S. Pat. No. 4,643,949. (The term "JP-A" as used herein means an "unexamined published Japanese patent application".)

However, the polycarbonate polyurethane resin has a number of problems in that materials for preparing the resin are expensive and limitative, and the reaction conditions for preparing the resin are undesirably complicated. Thus, it is very difficult to obtain the resin having desired physical strength.

A magnetic recording medium wherein a polyether polyester polyurethane resin containing in part a polyether polyol which is hydrolyzed to a small extent has been used as a polyester type polyurethane resin having improved hydrolysis resistance, as disclosed in JP-A-61-104325. However, in this case, the above noted defect of the polyester polyurethane resin that it is easily hydrolyzed could not completely be avoided. Running durability at high temperatures and high humidities and durability after a long storage without deteriorating electromagnetic characteristics and running property were not satisfactory.

SUMMARY OF THE INVENTION

An object of the present invention is to provide a magnetic recording medium having excellent electromagnetic characteristics, improved running durability and having good stability after a long storage.

Another object of the present invention is to provide a magnetic recording medium having excellent electromagnetic characteristics and running durability at high temperatures and high humidities.

Other objects and effects of the present invention will be apparent from the following description.

To achieve the foregoing objects, the present invention provides a magnetic recording medium comprising a non-magnetic support having thereon a magnetic layer comprising ferromagnetic particles dispersed in a binder, the binder comprising a vinyl chloride copolymer and a polyurethane resin, wherein the polyurethane resin is a polyether polyurethane resin containing a polyether polyol having a ring structure.

DETAILED DESCRIPTION OF THE INVENTION

The preferred embodiments of the magnetic recording medium of this invention are as follows.

1) The above described magnetic recording medium wherein the above ring structure is an aromatic ring and/or an alicyclic ring.

2) The above described magnetic recording medium wherein the polyether polyol having the above ring structure is at least one polyol represented by formula (I):

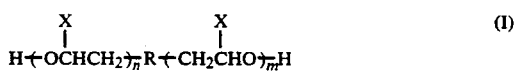

wherein X is hydrogen atom or a methyl group; n and m, which may be the same or different, each represents an integer of from 1 to 30, preferably from 1 to 10; and R represents

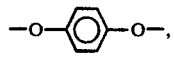

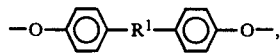

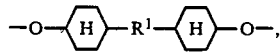

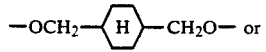

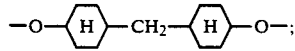

wherein $R^1$ represnets

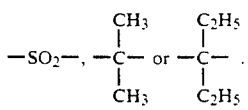

3) The above described magnetic recording medium wherein the polyether polyol having a ring structure in an amount of 80 wt % or more based on the total weight of the polyol component in the binder.

4) The above described magnetic recording medium wherein the above polyether polyurethane resin is present in an amount of from 30 to 90 wt % based on the total weight of the binder.

The magnetic recording medium using vinyl chloride copolymer and the above predetermined polyether polyurethane resin of this invention exhibit not only excellent electromagnetic conversion characteristics but also improved running durability and storage stability.

That is, the rigidity of the magnetic layer and the adhesiveness between the magnetic layer and the non-magnetic support can be insured by using a vinyl chloride copolymer, and improved hydrolysis resistance can be assured and thus excellent storage stability can be insured by using a polyether polyurethane resin containing a polyether polyol having a ring structure.

Further, great physical strength of a coated film can be obtained by using a polyether polyurethane resin containing a polyether polyol having a ring structure, overcoming the disadvantage that the conventional polyether polyurethane and polycarbonate polyurethane can not provide the coated film with sufficient physical strength.

As a result of the above, a magnetic recording medium having excellent electromagnetic characteristics and improved running durability even at high temperatures and at high humidities can be obtained.

The magnetic recording medium of this invention basically has a non-magnetic support having provided thereon a magnetic layer comprised of ferromagnetic particles dispersed in a binder.

The non-magnetic supports which can be used in this invention are not particularly limited and those that are conventionally used can be used. The materials for forming a non-magnetic support include films of various synthetic resins such as polyethylene terephthalate, polyethylene, polypropylene, polycarbonate, polyethylene naphthalate, polyamide, polyamide imide, polyimide, polysulfon or polyether sulfon, and metal foils such as an aluminum foil or a stainless foil. The non-magnetic support generally has a thickness of from 2.5 to 100 μm, preferably from 3 to 80 μm.

A back coating may be provided on the surface which is opposite to the surface provided with a magnetic layer of the non-magnetic support.

As described above, the magnetic recording medium of this invention is basically comprised of a non-magnetic support and a magnetic layer comprised of ferromagnetic particles dispersed in a binder and provided thereon.

Polyurethane resins are polycarbonate polyurethane having an ether bond are generally excellent in hydrolysis resistance, but when they are coated to form a magnetic layer, they can not provide the magnetic layer with sufficient physical strength. As a result of extensive studies to solve this problem, it was found that sufficient physical strength of a coated film can be obtained by using as a resin component a polyether polyurethane resin containing a polyether polyol having a ring structure.

That is, in the present invention the binder for forming a magnetic layer contains a vinyl chloride copolymer and as a resin component a polyether polyurethane resin containing a polyether polyol having a ring structure.

As a result, a magnetic recording medium having excellent electromagnetic conversion characteristics and running durability, particularly even at high temperatures and high humidities, can be obtained by using the above described binder. In other words, the rigidity of the magnetic layer and the adhesiveness between the magnetic layer and the non-magnetic support can be insured by using a vinyl chloride copolymer, and improved hydrolysis resistance can be assured and thus excellent storage stability can be insured by using a polyether polyurethane resin containing a polyether polyol having a ring structure as a resin component in a binder.

Further, sufficient physical strength of a coated film can be obtained by using a polyether polyurethane resin containing a polyether polyol having a ring structure, removing the disadvantage that the conventional polyether polyurethane and polycarbonate polyurethane can not provide the coated film with sufficient physical strength. As a result thereof, a magnetic recording medium having excellent electromagnetic conversion characteristics and improved running durability even at high temperatures and high humidities can be obtained.

The amount of the above polyurethane having the ether bond in the whole binder is preferably from 30 to 90 wt %, more preferably from 50 to 70 wt %, based on the total weight of the binder to insure excellent running durability at high temperatures and high humidities.

It is preferable for the polyether polyurethane resin of this invention to contain as a resin component a polyether polyol having a ring structure having formula (I) below.

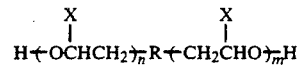

In the above formula,
X is a hydrogen atom or a methyl group,
each n and m is an integer of from 1 to 30, and may be the same or different from each other, and
R represents

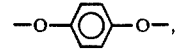

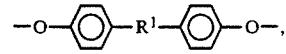

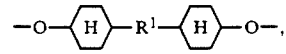

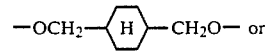

-continued

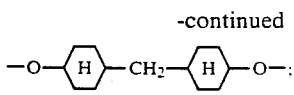

wherein $R^1$ represnets

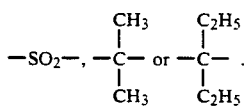

Mechanical properties such as the tensile strength of a resin can be improved by introducing the above described polyol into the skeleton of a polyurethane resin. It is preferred that the polyether polyol having the above described ring structure be present in an amount of 80 wt % or more based on the total amount of polyol present in the polyurethane resin.

The above polyether polyol is commercially available, and can be generally obtained by adding ethylene oxide or propylene oxide to R in formula (I) above.

The Polyether polyurethane employed in this invention can be obtained by reacting the above polyether polyol and the polyisocyanate shown below. Examples of polyisocyanate include tolylene diisocyanate, xylylene diisocyanate, hexamethylene diisocyanate, lysine diisocyanate, isophorone diisocyanate, cyclohexane diisocyanate, 2,4-tolylene diisocyanate, 2,6-tolylene diisocyanate, 4,4'-diphenylmethane diisocyanate, p-phenylene diisocyanate, m-phenylene diisocyanate and 1,5-naphthylene diisocyanate. Among these, 2,4-tolylene diisocyanate and 4,4'-diphenylmethane diisocyanate are preferred.

The polycarbonate polyurethane having an ether bond of this invention can be prepared by the following method for preparing a conventional polycarbonate polyurethane.

Thus, the polyether polyol polyurethane used as a binder of this invention can be synthesized by reacting (1) a polyether polyol and (2) a polyisocyanate, using the above described materials in the following manner.

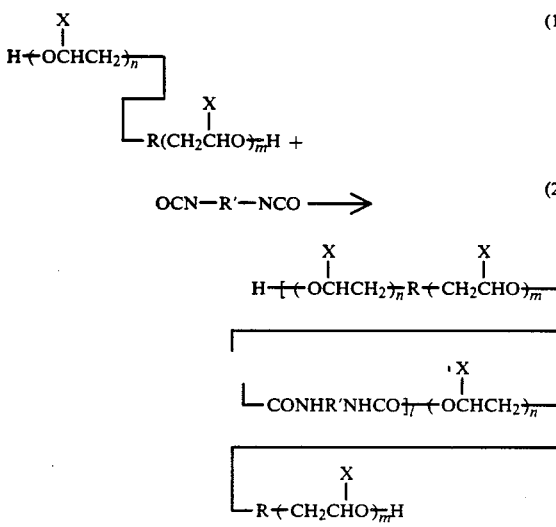

In the above formula, X, R, n and m are preferably the same as defined in the above formula (I), l is an integer of from 1 to 30, preferably from 2 to 10, R' is generally a hydrocarbon group, an aromatic group and the like, and is not particularly limited.

The above polyether polyol has a molecular weight of preferably from 250 to 3,000. When the polyether diol has too low a molecular weight, the density of the urethane group of the resulting polyurethane becomes too high and the softness of the resin becomes poor and the solubility to the solvent also becomes poor. On the other hand, when the polyether polyol has too high a molecular weight, the amount of polyether polyol in the resin becomes too high, and the density of the urethane group of the resulting polyurethane becomes too low, and therefore, wear resistance and durability of the resin become decreased.

The polyether polyurethane can be synthesized by the reaction of the polyol and a polyisocyanate, and a polyether polyurethane having desired physical properties can be obtained by using a chain-extending agent in the above reaction, if necessary.

Examples of the chain-extending agent include the above polyhydric alcohols, an aliphatic polyamine, an acrylic polyamine and aromatic polyamine. Polyhydric alcohols are preferred.

The above polyether polyurethane resins have a number average molecular weight of preferably from 10,000 to 150,000, more preferably from 20,000 to 80,000. When polyether polyurethane resins having a molecular weight of less than 10,000 are used, running durability tends to be not sufficiently improved. When polyether polyurethane resins having a molecular weight of more than 150,000 are used, solubility of the resin tends to become poor, which is disadvantageous in light of manufacturing process.

It is necessary for the magnetic recording medium of this invention to use the above polyether polyurethane and vinyl chloride copolymer in combination as a binder.

Examples of the vinyl chloride copolymer include vinyl chloride-vinyl acetate copolymers, vinyl chloride-acrylate copolymers, vinyl chloride-methacrylate copolymers, vinyl chloride-vinyl acetate-(vinyl alcohol, maleic acid and/or acrylic acid) copolymers, vinyl chloride-vinyl propionate copolymers, vinyl chloride-vinylidene chloride copolymers, and vinyl chloride-acrylonitrile copolymers. Among these, vinyl chloride-vinyl acetate-(vinyl alcohol, maleic acid and/or acrylic acid) copolymers are preferred, and vinyl chloride-vinyl acetate-maleic acid copolymers are particularly preferred. The amount of this vinyl chloride copolymer in the total binder is preferably from 10 to 60 wt %, particularly preferably from 20 to 50 wt %, based on the total weight of the binder.

Other binders can be used with the above two kinds of resins in combination, and are not particularly limited. Other binders which can be employed include polyurethane resins other than those of this invention, ethylene-vinyl acetate copolymers, nitrocellulose resins, cellulose compounds such as cellulose nitrate, cellulose acetate butylate or cellulose acetate propionate, acrylic resins, polyvinyl acetal resins and polyvinyl butyral resins.

It is preferred that the resins used as binder, including those according to this invention, further contain at least one of following polar groups in addition to those contained in the main chain; carboxylic acid, sulfinic acid, sulfonic acid, phosphoric acid, acid groups such as a sulfuric acid ester group or a phosphoric acid ester group, amphoteric groups such as amino acids, aminosulfonic acids, sulfuric acid esters or phosphoric acid esters of aminoalcohol or alkyl betain agents, amino groups, imino groups, imide groups, amido groups, hydroxyl groups, alkoxy groups, thiol groups, halogen groups, silyl groups and siloxane groups, in an amount of from $1 \times 10^{-6}$ to $1 \times 10^{-2}$ equivalent per 1 g of the resin.

As described above, it is preferred to use polyisocyanate compounds in combination with the resins for the binder in this invention. Polyisocyanate compounds include a reaction product of 3 moles of diisocyanate such as tolylene diisocyanate or xylylene diisocyanate and 1 mole of trimethylol propane, and polymethylene polyphenylpolyisocyanates.

The Ferromagnetic particles which can be used in this invention are not particularly limited. Examples thereof include ferromagnetic alloy particles, ferromagnetic metal fine particles mainly comprised of iron, metal particles of metal oxides such as $\gamma$-$Fe_2O_3$ or $Fe_3O_4$ and ferromagnetic particles of modified metal oxides such as Co-modified iron oxide, modified barium ferrite and modified strontium ferrite. The acicular ratio of the above ferromagnetic particles preferably is 1/1 to 50/1, more preferably 5/1 or higher. The average particle diameter preferably is from 0.01 to 1.0 $\mu$m, and the BET specific surface area of the particles preferably is from 20 to 70 $m^2/g$.

The above barium ferrite preferably has an average particle diameter of from 0.001 to 1.0 $\mu$m and a thickness of $\frac{1}{2}$ to 1/20 of the diameter thereof. The specific gravity thereof preferably is from 4 to 6 g/cc and the BET spcific surface area preferably is from 20 to 70 $m^2/g$.

The above ferromagnetic alloy particles preferably have a metal content of 75 wt % or more, and more than 80 wt % of the metal content preferably is at least one kind of ferromagnetic metal or alloy (e.g., Fe, Co, Ni, Fe-Co, Fe-Ni, Co-Ni, Co-Ni-Fe), and 20 wt % or lower of the metal content may contain other elements (e.g., Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, P). The above ferromagnetic metal content may contain a slight amount of water, hydroxides or oxides. The method for preparing the above ferromagnetic metal particles is already known and ferromagnetic alloy particles used in this invention can be prepared by a conventional method.

The magnetic layer of the magnetic recording medium of this invention may contain abrasive agents having a Mohs' hardness of 6 or higher.

Any abrasive agents having a Mohs' hardness of 6 or higher can be used. Examples thereof include $\alpha$-$Fe_2O_3$, $Cr_2O_3$, $\alpha$-$Al_2O_3$ and SiC. These can be used alone or in combination.

The abrasive agents preferably have an average particle diameter of from 0.01 to 5.0 $\mu$m, particularly preferably from 0.1 to 1.0 $\mu$m.

The amount of abrasive agents preferably is from 0.1 to 20 parts by weight, more preferably from 1 to 10 parts by weight per 100 parts by weight of ferromagnetic particles.

In addition to the above abrasive agents, carbon black (particularly carbon black having an average particle diameter of from 10 to 300 $\mu$m) is preferably included in the magnetic layer.

The method for preparing a magnetic recording medium of this invention will be hereinafter illustrated.

A magnetic coating composition is prepared by mixing and kneading ferromagnetic particles such as ferromagnetic metal fine particles an binders, and if necessary, abrasive agents, and filling materials with a solvent. The solvent can be one which is conventionally used for preparing a magnetic coating composition.

The method for mixing and kneading is not particularly limited, and the order of adding each component can optionally be determined.

The mixing and kneading device for use to preparing a magnetic coating composition can be a conventional one, such as, for example, a two-roll mill, a three-roll mill, a ball mill, a pebble mill, a tron mill, a sand grinder, a Szegvari attritor, a high speed impeller dispersing machine, a high speed stone mill, a high speed impact mill, a disper, a kneader, a high speed mixer, a homogenizer or an ultrasonic dispersing device.

Conventional additives such as dispersing agents, antistatic agents or lubricating agents or the like can be used when a magnetic coating composition is prepared.

The thus prepared magnetic coating composition is coated on the above described non magnetic support. It can be coated directly or through an intermediate layer, such as an adhesive layer, on the non-magnetic support.

The method for coating the magnetic coating composition on the non-magnetic support can be a conventional method and includes an air doctor coating, a blade coating, a rod coating, an extruding coating, an air knife coating, a squeeze coating, an impregnating coating, a reverse roll coating, a transfer roll coating, a gravure coating, a kiss coating, a cast coating, a spray coating and a spin coating. Coating methods other than the above can also be applied.

The thus coated magnetic layer has a dry thickness of generally from about 0.5 to 10 $\mu$m, and preferably from 1.5 to 7.0 $\mu$m.

The magnetic layer thus provided on the non-magnetic support is subjected to magnetic orientation to orientate ferromagnetic particles contained therein, and then dried. If necessary, it is provided with a surface smoothing treatment and then slit to a desired shape.

This invention will be illustrated in more detail by the following Examples and Comparative Examples, but the present invention is not construed as being limited thereto. In all Examples, and Comparative Examples, all parts are by weight.

EXAMPLE 1

The following composition was mixed, kneaded and dispersed in a ball mill for 48 hours and then 5 parts of polyisocyanate ("Collonate L" produced by Nippon Polyurethane Co., Ltd.) was added thereto, and further mixed, kneaded and dispersed for 1 hour, and filtrated using a filter having an average pore diameter of 1 $\mu$m to prepared a magnetic coating composition. The thus obtained magnetic coating composition was coated, using a reverse roll on a polyethylene terephthalate support having a thickness of 16 $\mu$m, in a dry thickness of 6.0 $\mu$m.

| Formulation of Magnetic Coating Composition | |
| --- | --- |
| Co-containing $\gamma$-$Fe_2O_3$ particles (Nitrogen adsorption specific surface area: 50 $m^2/g$) | 100 parts |
| Vinyl chloride/vinyl acetate/ maleic anhydride copolymer (VMCH, produced by Union Carbide Co., Ltd.) | 8 parts |
| Polyether polyurethane resin A | 10 parts |

-continued

| Formulation of Magnetic Coating Composition | |
|---|---|
| (See below) | |
| Carbon black | 5 parts |
| Cr₂O₃ | 2 parts |
| Oleic acid | 1 part |
| Butyl stearate | 1 part |
| Methyl ethyl ketone | 200 parts |
| Toluene | 50 parts |
| Cyclohexanone | 50 parts |

The above polyether polyurethane resin A was prepared from (a) a polyol obtained by reacting 1 mole of bisphenol A and 6 to 16 moles of ethylene oxide as the polyether polyol component and from (b) 4,4'-diphenylmethane diisocyanate as the polyisocyanate component. It had a weight average molecular weight of 100,000, a glass transition point (Tg) of +38° C. and a breaking strength of 6.2 kg/cm². The polyether polyurethane resin A is basically represented by the following formula.

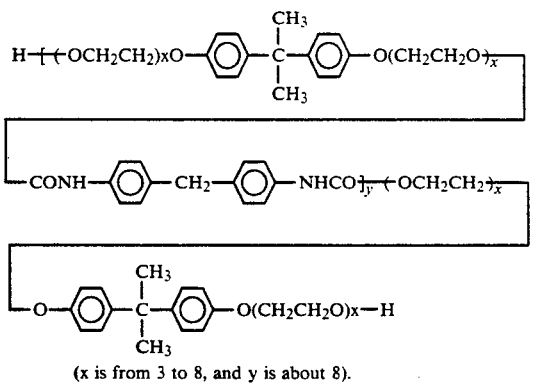

(x is from 3 to 8, and y is about 8).

The non-magnetic support thus coated with the magnetic coating composition was provided with magnetic orientation with magnets of 3,000 gauss while the magnetic coating composition was undried. It was then dried, provided with super .calendering treatment and slit to a ½ inch width to prepare a magnetic tape.

EXAMPLE 2

The same procedure as in Example 1 was repeated to prepare a magnetic tape, except that the following polyether polyurethane resin B was used instead of polyether polyurethane resin A.

The polyether polyurethane resin B was obtained from (a) a polyol which was obtained by reacting 1 mole of hydroquinone and 6 to 16 moles of ethylene oxide as the polyether polyol component and from (b) 4,4'-diphenylmethane diisocyanate as the polyisocyanate component. It had a weight average molecular weight of 120,000, a Tg of +23° C. and a breaking strength of 5.7 kg/cm². The polyester polyurethane resin B is basically represented by the following formula.

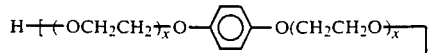
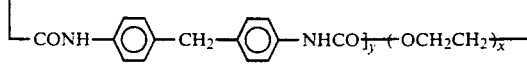
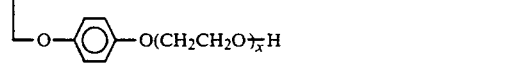

(x is from 3 to 8 and y is about 10).

COMPARATIVE EXAMPLE 1

The same procedure as in Example 1 was repeated to prepare a magnetic tape, except that the conventional polycarbonate polyurethane C was used instead of the polyether polyurethane resin A.

Polycarbonate polyurethane C was obtained from 1,6-hexane diol as the polyhydric alcohol component and from 4,4'-diphenylmethane diisocyanate as the polyisocyanate component. The weight average molecular weight was 107,000, Tg was −20° C. and the breaking strength was 4.0 kg/cm².

COMPARATIVE EXAMPLE 2

The same procedure as in Example 1 was repeated to prepare a magnetic tape, except that the conventional polycarbonate polyurethane D was used instead of the polyether polyurethane resin A.

Polycarbonate polyurethane D was obtained from butane diol as the polyhydric alcohol component and from 4,4'-diphenylmethane diisocyanate as the polyisocyanate component. It had a weight average molecular weight of 106,000, a Tg of −25° C. and a breaking strength of 3.8 kg/cm².

COMPARATIVE EXAMPLE 3

The same procedure as in Example 1 was repeated to prepare a magnetic tape, except that the phenoxy resin of Example 1 was not used and the amount of the polyether polycarbonate polyurethane A was changed to from 13 parts to 10 parts.

The physical properties of the thus obtained sample tapes were evaluated in the following manners.

EVALUATION

Reproduced output

Using a magnetic tape device "FACOM-613" equipped with a permalloy magnetic head manufactured by FUJITSU LIMITED, the output of 6250 BPI at a tape speed rate of 5.0 m/sec. was measured and is shown in terms of relative values based on a NBS (National Bureau of Standard) tape.

Adhesiveness

Magnetic tapes which had been allowed to stand at 60° C. and 90% RH for seven days and thirty days respectively were used. Using the same magnetic tape apparatus as described above, tapes of total length (2400 feet) were sent forward at a running speed rate of 5.0 m/sec. and then rewound at a running speed rate of 15 m/sec. repeatedly for five times, and thereafter, the foreign matter adhered on the surface of the tapes at the place where the tapes had started to run were visually observed with the naked eyes and evaluated on the following five basis (AA to EE).

AA No foreign matter was adhered.
BB: Foreign matter was slightly adhered.
CC: Foreign matter was adhered a little.
DD: Foreign matter was considerably adhered.
EE: Foreign matter was heavily adhered.

Friction coefficient

While a magnetic tape was wound around a stainless steel pole having a diameter of 24 mm, with the surface of the magnetic layer contacted therewith at a contact angle of 180°, the tensile strength ($T_2$) necessary to rotate the stainless steel pole at a rotating speed rate of 63 rpm with the tape having a tensile strength of 65 g ($T_1$) was measured, an the friction coefficient $\mu$ was calculated by the following equation.

$$\mu = 1/\pi \cdot l_n(T_2/T_1)$$

Tapes which had been allowed to stand at 60° C., and 90% RH for seven days were used to measure friction coefficient.

Physical properties of the tapes of each example are shown in Table 1.

TABALE 1

| | Reproduced output (dB) | Adhesion test (60° C., 90% RH) 7 days | 30 days | Friction coefficient |
|---|---|---|---|---|
| Example 1 | +20 | AA | AA | 0.30 |
| Example 2 | +20 | AA | AA | 0.32 |
| Comparative Example 1 | 0 | BB | CC | 0.36 |
| Comparative Example 2 | −10 | CC | EE | 0.38 |

As clear from the results shown in Table 1, the magnetic recording medium of this invention using the predetermined polyurether polyurethane resin according to the present invention as a binder is excellent in electromagnetic conversion characteristics as shown by its high reproduced output and has improved running durability as shown by the good results of adhesion tests and friction coefficient particularly at high temperatures and high humidities.

On the other hand, Comparative Examples 1 and 2 using conventional conversion polycarbonate polyurethanes exhibit inferior electromagnetic characteristics, and its running durability is not as good particularly at high temperatures and high humidities.

While the invention has been described in detail and with reference to specific examples thereof, it will be apparent to one skilled in the art that various changes and modifications can be made therein without departing from the spirit and scope thereof.

What is claimed is:

1. A magnetic recording medium comprising a nonmagnetic support having thereon a magnetic layer comprising ferromagnetic particles dispersed in a binder, said binder comprising a vinyl chloride copolymer composed of vinyl chloride as a main component in an amount of from 10 to 60 wt % based on the total weight of the binder and a polyurethane resin in an amount of from 30 to 90 wt % based on the total weight of the binder, wherein said vinyl chloride copolymer is selected from the group consisting of a vinyl chloride-vinyl acetate-vinyl alcohol copoylmer, a vinyl chloride-vinyl acetate-maleic acid copolymer, a vinyl chloride-vinyl acetate-acrylic acid copolymer, a vinyl chloride-vinyl acetate copolymer, a vinyl chloride-methacrylate copolymer, a vinyl chloride-vinyl propionate copolymer, and a vinyl chloride-vinylidene chloride copolymer, said polyurethane resin is a polyether polyurethane resin which does not contain polyester segments, said polyether polyurethane resin containing a polyether polyol having an aromatic and/or an alicyclic ring structure in an amount of 80 wt % or more based on the total weight of the polyol component in the binder.

2. A magnetic recording medium as claimed in claim 1, wherein said polyether polyol having a ring structure is at least one polyol represented by formula (I):

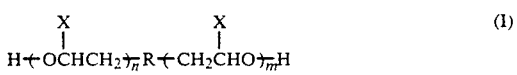

wherein X represents a hydrogen atom or a methyl group; n and m, which may be the same or different, each represents an integer of from 1 to 30; and R represents

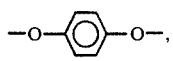

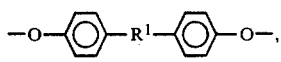

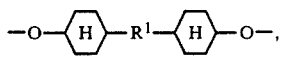

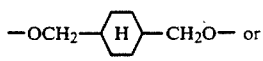

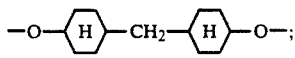

wherein $R^1$ represnets

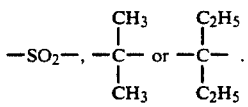

3. A magnetic recording medium as claimed in claim 1, wherein said polyether polyurethane resin has a number average molecular weight of from 10,000 to 150,000.

* * * * *